United States Patent Office 3,281,340

Patented Oct. 25, 1966

3,281,340

PROCESS OF PREPARING LITHOGRAPHIC PLATES

Melvyn London, 334 Willow, Deerfield, Ill.

No Drawing. Filed Nov. 19, 1965, Ser. No. 508,866
11 Claims. (Cl. 204—17)

This application is a continuation-in-part of my application Serial No. 146,367, filed October 19, 1961, and now abandoned.

This invention relates to a new and superior method of preparing lithographic printing plates by electrolytically depositing copper contained in solutions of copper salts in non-aqueous solvents onto the image areas of metallic base plates such as aluminum, that can be wetted by water.

Lithographic printing depends upon the different wetting characteristics of different materials. Aluminum, or more accurately the oxide of aluminum that forms on an aluminum surface that is exposed to the atmosphere, can be wetted with water, and an aluminum surface that is wet with water resists being wetted with oily substances. For example, when a roller saturated with an oily substance is rolled across the wet aluminum surface, the oil will adhere to the roller rather than to the aluminum surface. Other metals, for example, copper, can be wetted with oily substances and when they are thus wetted, water will not adhere to the oil coated surface.

These different wetting properties are employed as the basis of lithographic printing methods. A flat sheet of aluminum that is partially coated with copper in areas that form an image that is to be printed, can be employed by wetting the aluminum with water and the copper with an oily ink. When a sheet of paper is pressed into contact with the plate, only the copper areas will transfer ink to the paper and the shape of the image of copper will be printed on the paper. In commercial lithography the ink image is first transferred to a rubber blanket which in turn transfers it to the paper, but the principle is the same.

The usual method for preparation of a lithographic printing plate employs a flat aluminum sheet that may be mechanically grained by known methods to improve its water retaining properties. Prior to depositing copper, the sheet is treated with an acid solution that removes the oxide film and produces a fresh and uniform oxide layer, after which the grained surface is coated with a photosensitive emulsion. This emulsion is an aqueous-base emulsion containing material that causes it to become hard and resistant to water when exposed to light, preferably to the ultra-violet wave length range.

The image to be printed is photographically transferred to the emulsion coated plate by known methods, for example, contact printing through a photographic positive, after which the plate is developed. Developing consists of removing the unexposed emulsion which is still highly sensitive to water, by washing the plate under conditions that remove the unexposed and water-sensitive emulsion, but not the exposed and relatively water-insensitive emulsion.

After the plate is developed, a copper coating is deposited on, and only on, those areas of the plate no longer covered by emulsion. While such deposition can be accomplished by chemical displacement reactions, only a relatively thin layer of copper can be so deposited, even though techniques such as deep-etching are employed to increase the thickness of deposit. Since the copper coating is subjected to forces of abrasion while the lithographic plate is on press, the life of the plate is dependent on the thickness of the copper coating. As a consequence, plates made by chemical deposition processes are unsuitable whenever long-lived printing runs are desired.

In an attempt to satisfy industry's ever increasing need for long life plates, electrolytic deposition of copper in the image areas of developed plates has been practiced. Electrolytically deposited copper can, in theory, be deposited to any desired thickness. However, as will be shown hereinafter, practical considerations seriously limit the thickness of the deposit.

Furthermore, not simply the thickness but also the nature of the copper deposit is of extreme importance to the life, quality and usefulness of the lithographic plate. The tacky ink and high speed application used in modern presses tend literally to pull the copper coating from the base plate, and so the firmness of the bond between the copper and the base plate seriously limits the life of the plate.

The methods used heretofore of preparing lithographic plates by electro-deposition entail the use of electrolytic baths. During the process of electroplating, the lithographic plate lies submerged in the plating solution containing the copper salt. In this process the electroplating solution is aqueous in nature. Such a process suffers from an inherent defect; because the light-hardened emulsion used to protect the non-image area from the action of the electrolyte is only partially water resistant, and not completely inert to water, the hardened emulsion will absorb water from the electrolytic bath, and will lift from the base plate as it is subjected to the continued soaking in the bath. Soaking the plate causes lateral absorption as well as normal penetration, so the areas most quickly affected are the edges of the emulsion where the image should be sharp. The result is that the electrolyte solution penetrates the emulsion at the most critical positions, so that the emulsion is lifted at the edges or saturated with electrolyte. As a result, plating takes place at the edge of the non-image area, where no plating is desired. In other words, the small dots which constitute the copper deposit spread beyond the image area, and the sharp print desired is distorted; the longer the plating is carried out (in a desire to obtain a long-lived plate) the greater is such distortion.

The type of copper deposit is also intimately connected with the quality of the impression obtained from the plate during printing. The copper deposit consists of tiny discrete "dots" of copper laid down on the image area as deposition continues. (The smallest possible "dot" is, of course, one atom of copper.) An ideal deposit would consist of firmly binded dots of copper laid down one over the other to the desired thickness, with no spreading of the dots beyond the image area. In other words, what is desired is unlimited deposition in the vertical dimension with no lateral spreading. However, as practiced heretofore, the thicker the copper deposit, the more the deposited dots tended to "spread out" into the non-image areas. Thus, the longer one plated out copper, the more the tone values were spread, resulting in an image that was too "full"—the dots were too big, so the picture lacked contrast, was fuzzy, and had poor color rendition.

Further, it is important to have a uniformly dense, non-porous and non-grainy copper deposit; such a deposit best resists the forces of abrasion, and leads to predictability in the life of the plate.

In addition, the density, porosity and graininess of the deposit influence the quality of the print obtained from a lithographic plate. High density, low porosity and non-graininess are desired to give sharp, clear, uniform, non-grainy impressions.

The methods of preparing lithographic plates known heretofore are not capable of giving thick, dense, uniform, non-porous, non-grainy deposits which adhere tightly to the base metal, and which sharply delineate the image areas. By known procedures, it was possible to increase the thickness of deposit only at the sacrifice of quality—a decrease in density, sharpness, and firmness of bonding of the copper deposit and an increase in graininess and porosity. As a consequence, long lived plates of continued excellent quality, including sharp half-tone reproduction, throughout their lives were impossible of attainment.

It is an object of this invention to produce lithographic plates which give sharp, clear, uniform, non-grainy impressions.

It is another object of this invention to provide an electrolytic process for producing a copper image on an aluminum lithographic plate which has a longer life on press than plates producible by processes known heretofore.

Another object of this invention is to provide an electrolytic process for producing a copper image on an aluminum lithographic plate which gives a thick, dense, uniform, non-grainy deposit of copper without adversely affecting the water sensitive emulsion that acts as a resist and forms the image to be reproduced.

Still another object of this invention is to provide an electrolytic process for producing a copper image on an aluminum lithographic plate without adversely affecting the water sensitive emulsion that acts as a resist and forms the image to be reproduced.

A further object of this invention is to provide an electrolytic process for producing a copper image on an aluminum lithographic plate with very simple equipment that can be used in small shops that have neither the space nor the finances to invest in large-scale equipment.

A still further object of this invention is to provide an electrolytic process for producing a copper image on an aluminum lithographic plate which consists of very small dots of deposited copper, so that the image is sharp.

These objectives are accomplished by the within described invention, which provides a process employing a standard aluminum lithographic plate having the well-known surface characteristics for this purpose. The plate is coated in the usual way with a water sensitive emulsion such as gum arabic, and is exposed and developed in accordance with the methods which are known to the prior art.

The essence of this invention lies in the novel method and solvents used for electrodeposition of copper on the exposed and developed lithographic plate.

According to the prior art, the exposed and developed plate is ordinarily submerged in an aqueous electrolytic bath containing dissolved copper salts, and copper is deposited electrolytically on these areas which are not covered by resist, that is, those areas not covered by exposed and relatively water-insensitive emulsion. As already mentioned, since the exposed emulsion is not completely insensitive to water, the aqueous electroplating solution penetrated the exposed emulsion so that some undesired plating takes place at the edge of the image area.

If electrodeposition in water as solvent is carried out long enough to give a thick copper deposit, enough penetration of the emulsion occurs to give a poorly bound deposit and a distorted image.

I have found a practical way to avoid the aforementioned difficulties by using certain substantially non-aqueous solvents for the copper salts used in the electrodeposition process.

The solvent employed to provide the non-aqueous electrolyte may be any suitable solvent having dielectric properties that produce ionization of a copper salt and are otherwise not detrimental to the materials employed. Such solvents as acetaldehyde, acetonitrile, amyl alcohol, benzaldehyde, benzonitrile, benzoyl chloride, isobutyl alcohol, cyclohexanol, cyclohexanone, ethylene diamine, formic acid, furfuraldehyde, glycerol, glycol, methanol, nitrobenzene, nitroethane, and isopropyl alcohol may be used just to name a few. Although the electrolyte solution is referred to as substantialy anhydrous, it is not intended necessarily to be completely free of all traces of water. The water sensitivity of the hardened emulsion is such that it will resist large amounts of water for a short time, and small amounts of water for a prolonged time. Therefore, the criterion is whether or not the emulsion is attacked by the amount of water present rather than whether or not the solution is anhydrous. If the difficulty of separating the last traces of water from the solvent is too great, if the solvent is slightly deliquescent, if other reagents are aqueous, or a reaction product produces water, these small amounts of water, up to about seven percent, can be tolerated for almost an indefinite period in that they do not affect the properties of the emulsion. It is difficult to place exact limits on the amount of water that can be tolerated because different emulsions which are hardened by different photosensitive reagents and which are subjected to different intensities of light exposure are capable of tolerating different amounts of water. However, it is readily determined when the critical amount has been exceeded, because the emulsion will soften or lift or otherwise exhibit sensitivity to water.

The criterion for selecting the copper salt is whether or not it will ionize in the solvent to an adequate extent. Such salts as copper nitrate, copper chloride, copper sulfite, copper cyanide, and copper triphosphate, to name a few, have been successfully employed.

While satisfactory lithographic plates can be prepared by electroplating either in acid or alkaline medium, I have found that for the purposes of my invention it is preferable to carry out the process in the presence of sufficient acid to give a pH below 7. The presence of acid aids the solubility of copper salts in the substantially non-aqueous solvents used in the practice of this invention. Any of the strong acids commonly used in the lithographic trade, such as hydrochloric or sulfuric acid, is satisfactory. However, the use of acid is not an essential part of this invention, inasmuch as electroplating can be carried out in alkaline meduim if the copper salts are kept in solution by methods well known to those skilled in the art, as for example, by the addition of cyanide salts.

Throughout the specification and claims, the water sensitive lithographic metal is referred to as aluminum and the oil-sensitive second metal is referred to as copper. These designations are employed for convenience in the description, and it should be understood that there are many metals that are equivalent to and interchangeable with both aluminum and copper. It is intended throughout this specification and the appended claims that whenever aluminum is referred to, other water-wettable metals, including zinc, Monel, magnesium, chromium, stainless steel, etc. may be employed and these metals may be employed either as a base sheet or as a thin coating supported on a different material. Similarly, whenever copper is referred to, it is intended that silver, gold and other metals that are wettable with oily ink may be used. Of course these metals must be deposited by a suitable selection of anode and electrolyte material; however, these materials are well-known in the electroplating art and need not be described in detail herein.

If there is any water at all in the electrolyte solution, minimum contact time between the solution and the exposed, developed plate is desirable. Accordingly, this invention may be practiced in such a way that the lithographic plate is at no time submerged in an electrolytic bath. The exposed, developed aluminum plate is connected as the cathode of a D.C. circuit. An insulating material that is capable of absorbing a liquid is maintained in contact with a copper anode preferably employing the anode as a back-up plate. This absorbent member may be a dauber or roller made of such materials as lambs wool, sponge, mohair, etc. or it may be a paint brush or even one or a series of plastic capillary tubes having conductors recessed in the capillary.

The absorbent member is saturated with a non-aqueous solution of copper salts which completes the D.C. circuit when it is pressed into contact with areas of the plate that are not coated with emulsion. When such physical contact is made, the D.C. circuit is completed through the absorbed electrolytes, and copper ions are driven toward the aluminum plate and galvanically deposited on it. The aluminum plate is not submerged in the electrolytic solution, but is placed in a trough so that spent electrolytic solution runs out of the trough, and the only electroplating solution coming into contact with the lithographic plate comes from the absorbent member. The foregoing is generally termed brush plating.

Electrolysis, either in an electrolytic bath or by use of an absorbent member in the absence of an electrolytic bath, using an essentially non-aqueous electroplating solution, is continued until a copper deposit of any desired thickness is obtained. Since the resist is impervious to the action of the essentially non-aqueous electroplating solution, copper may be deposited to any desired thickness without penetration of the resist by electrolyte.

Carrying out the process described by this invention in the absence of an electrolytic bath has two advantages: first, somewhat more water may be tolerated in the electrolyte, since contact between electrolyte and resist is less than when the plate is submerged in the electroplating solution, and second, need is eliminated for the large, expensive baths and plating equipment required for electroplating baths.

The foregoing has described the advantage of the absence of water in the electroplating solution. However, it has been further found that the complete absence of water in the electroplating solution is not desirable for certain non-aqueous solvents, as described below. If the electrolytic solution is completely anhydrous, a thick copper deposit is readily obtainable, but the deposit on the image area is not sharply delineated. Consequently, the prints obtained from the lithographic plate are not sharp and clear. It will be recalled that the copper deposit consists of dots of copper. When deposition begins on a developed lithographic plate, dots can deposit only on exposed aluminum, and not on resist. As the deposit becomes thicker, copper dots deposit on top of already deposited copper, and consequently can spread somewhat beyond the original image area. The thicker the deposit, the greater is this tendency to spread. However, in the presence of water, hydrogen gas is evolved simultaneously with the deposition of copper. The evolved hydrogen "chews back" the deposited dot, keeping it small and restricting its spread beyond the image area.

Still another difficulty presents itself in getting high quality plates of long life. As already mentioned, to get such plates the copper deposit must be dense and nonporous. If water is present in the electrolyte solution, the evolution of hydrogen as electrodeposition occurs has a tendency to make the deposited metal porous and spongy. If the amount of water is decreased to avoid this undesirable effect, it is unexpectedly found that the particular non-aqueous solvent used for the electrolyte solution plays an important function in the quality of the plate obtained.

Some solvents, of which acetaldehyde, benzonitrile, nitrobenzene, and cyclohexanone are examples, contain no replaceable hydrogen atom from which hydrogen can be evolved. These are non-ionizable solvents. They are, so far as the process involved in the present invention, inert. In the complete absence of water, a thick deposit of copper is obtainable without attack on the resist. However, as the deposit becomes thick, the deposit spreads, due to the lack of "chewing back" by evolved hydrogen. Addition of water to such solvents increases the sharpness of the deposited dot, but also increases undesirable attack on the hardened emulsion. Furthermore, addition of water to the solvent, causes a relatively spongy, grainy deposit.

The other class of solvents is characterized by having a replaceable, ionizable hydrogen atom, such as methyl alcohol, ethyl alcohol, cyclohexanol, glycol, glycerol and formic acid. Even when such solvents are anhydrous, hydrogen is evolved during electrolysis, and so the "chewing back" effect results in desirable small deposited dots of copper. However, while with such solvents a sharp image is obtainable even with very thick deposit of copper, the deposit is relatively porous and spongy, and does not adhere sufficiently well to the base metal to permit maximum life of the plate on press.

These difficulties and disadvantages have been overcome by a preferred embodiment of this invention. I have discovered that certain organic solvents, characterized by the presence of two or more hydroxyl groups, when used in the herein described invention, give sharp, non-porous, non-spongy deposits of copper which adhere firmly to the base metal even when the copper deposit is made thick enough to give an extremely long lasting plate.

These preferred solvents include aliphatic and alicyclic polyhydroxylic compounds containing from two to six carbon atoms. Examples of these preferred solvents are propylene glycol; propanediol 1,3; ethylene glycol; butylene glycol; butanetriol 1,2,3; glycerol; glycerol monomethyl ether; butanediol 1,4; sorbitol; cyclohexanediol 1,2; cyclohexanetriol 1,3,5; dihydroxy-dimethylether; dihydroxymethylethyl ether; dihydroxy-diethylether; hexanetetraol 1,2,4,6; glycerol mono (hydroxypropyl) ether.

The advantages of using such polyhydroxylic compounds as solvents for the electrodeposition of copper in the preparation of lithographic plates are completely unexpected. Since relatively non-porous, spongy, nonretentive deposits are obtained with monohydroxylic solvents such as methyl alcohol, presumably due to hydrogen evolution from the hydroxyl groups during plating, the presence of more than one hydroxyl group might be expected to increase these disadvantages. I suggest that the advantages of these polyhydroxylic solvents may be due to the chelating effect on copper. The copper salt, by chelating the hydroxyl groups, prevents the uncontrolled evolution of hydrogen which gives rise to sponginess and lack of retention to the base metal. However, where a copper atom is deposited, a molecule of the solvent is freed from this chelating action at the very site where copper deposition takes place, and hydrogen may be simultaneously released from this particular solvent molecule, thus "chewing back" the copper dot just as it is deposited. This explanation is offered as a theory for the unexpected advantage of polyhydroxylic solvents. Whether this theory is correct or not does not affect the usefulness of the invention.

The advantages of the use of such polyols as solvents for the electrolytic solution apply either in the total absence of water or in the presence of small amounts of water. The amount of water which may be tolerated when such solvents are used is governed by the same criteria already discussed: the sensitivity of the hardened emulsion and the electrolyte solution. The advantage of not submerging the plate in an electroplating bath applies here also.

The following examples are given to illustrate several embodiments of the invention. Details of the coating and development of the lithographic plate and treatment of the plate after plating are merely illustrative of processes well known to the art, and may be varied by those skilled in the art. Such variations will not affect in any significant manner the practice of the invention as described herein: namely, the method of depositing copper on the plate so as to obtain a finished plate capable of giving long life in modern high speed presses.

For all the examples given, the same method of preparing a developed plate is used, as follows:

A thin flexible aluminum sheet mechanically grained for lithography in accordance with known procedures is treated with a solution of approximately one percent phosphoric acid in water. This treatment, referred to as counter-etching, prepares a grained aluminum surface to have a desirable, fresh, uniform oxide coating with properties suitable for lithography. The grained, counter-etched surface is then coated with an emulsion by spinning the plate in its own plane and distributing the emulsion at the axis of rotation. Centrifugal force causes the emulsion to flow evenly over the entire surface of the plate. The emulsion is a known photosensitive agent prepared by blending of 28.4 grams of gum arabic in water to make 100 cc. and adding 950 cc. of 14° Baumé sodium bichromate as a photosensitive agent and adjusting to a pH of 8.7 with 28% ammonium hydroxide. If desired, the emulsion may contain a wetting agent to improve the distribution over the surface of the plate, and a dye to provide visual control.

After the emulsion has coagulated, the plate is exposed by known techniques through a photographic positive and it is then developed by treatment with a solution of 320 cc. of 85% lactic acid, 1400 grams of calcium chloride, 700 grams of zinc chloride, and 2000 cc. of water. The developing treatment removes all of the photographically unexposed emulsion from the plate, and the photographically exposed and therefore hardened emulsion remains. The developing treatment, in effect, produces a stencil of emulsion leaving coated aluminum in all areas exposed to light and bare aluminum in all areas unexposed to light.

*Example 1.*—The developed plate is connected as the cathode in a D.C. circuit. The anode of that circuit is a rectangular copper plate five inches by seven inches which is fixed in a plastic handle so that it may be manipulated without exposing the user to electric current. The anode, or copper plate, which is fixed in the plastic holder is covered with a lambs wool cover that has a drawstring around its margin. The copper plate acts as the backup for the cover and is firmly in contact with it.

The anode-dauber assembly, constructed as above described, is saturated with electrolyte solution. The electrolyte solution is prepared by combining 11.4 grams of copper nitrate, 29.5 cc. of concentrated hydrochloric acid, and 875 cc. of methyl alcohol. The electrolyte-saturated dauber is then placed in contact with the bare portions of the aluminum plate to complete the circuit. The aluminum plate is placed in a trough so that spent electrolytic solution runs out of the trough. At twelve volts imposed across the D.C. circuit, a varying current ranging up to six amperes flows as the dauber, saturated in electrolyte, is rubbed back and forth over the aluminum plate. In portions where the emulsion is removed, plating of copper begins immediately and continues until the electrolytic process is deliberately terminated by breaking the circuit. The process is continued at least until a reasonably thick layer of copper is deposited, the thickness of which is difficult to determine because of the irregularly grained surface of the aluminum plate. After brief experience, an operator will know by observation when sufficient copper is deposited. When the copper coating has the characteristic copper color distinctly, that is the metallic red color of pure copper, without any darkening due to aluminum showing through, the plate is adequately coated for lithographing purposes. Of course if the plate is to be prepared for an extremely long run, the electroplating is continued twice or three times the length of time required to obtain an adequate coating, and if the plate is being prepared following a deep-etching treatment, the electrolytic process should continue until the copper is flush with the aluminum surface where etching did not occur. Generally speaking, there is no great difficulty in determining when an adequate coating of copper has been obtained and using too much is not detrimental. The appearance of the completely coated copper surface is quite distinctive from the appearance of the aluminum and the point where continued deposition of copper produces no change in the texture in the coated area is readily observable.

When the electrolytic treatment is finished, the plate is washed with alcohol to remove the copper solution and then coated with lacquer to provide a layer of lacquer over the entire plate. The lacquer is coated with oily ink, and the plate is then soaked in warm water and scrubbed. The warm water softens and loosens the hardened emulsion but it does not affect areas where lacquer is directly in contact with copper. In these areas the lacquer and oily ink will remain. Therefore, after the soaking in warm water and scrubbing, a stencil of lacquer and ink exist on the copper coated portion of the plate but the aluminum portion is without protective coating. The aluminum portion is then again counter-etched with one percent phosphoric acid solution to again renew the outside coating after which it is washed with water and coated with a thin layer of gum arabic to protect the oxide coating from deterioration. The plate in this condition may be stored for prolonged periods, but it is ready for use and may be installed on a lithographic printing press at any time. The gum arabic on the aluminum portion of the plate is wettable with water and will not accept ink while the oily ink on lacquer that covers the copper portion of the plate is wettable with a lithographing ink and will not accept water. Both the lacquer covering on the copper and the gum arabic covering on the aluminum will usually wear off during use to expose the freshly prepared aluminum and copper surfaces which will accept water and ink, respectively, to provide a plate capable of producing a great number of impressions.

This process gives plates with maximum lives of about 700,000 impressions. While these impressions are of excellent quality, attempts to increase the life of the plate by increasing the plating time reach a limit, since when the copper deposit becomes relatively thick, it separates from the base plate on press.

*Example 2.* — The developed plate is entirely submerged in a bath containing the electrolyte solution described in Example 1, and copper is deposited electrolytically while the plate is so submerged. The plate is treated similarly to Example 1 after electro-deposition is complete.

The impressions obtained from such a plate are substantially less sharp than those from Example 1.

If the procedure in this example is modified, in that precautions are taken to keep the electrolyte solution anhydrous (by using anhydrous reagent grade methanol and by bubbling in substantially anhydrous HCl gas), plates of the same quality as those in Example 1 are obtainable. However, not more than 500,000 impressions are obtainable.

*Example 3.* — The developed plate is treated as in Example 2, except that 875 cc. of anhydrous cyclohexanediol 1,3 is substituted for methyl alcohol, and 22 g. of substantially anhydrous HCl is bubbled in. The plate obtained gave over two million impressions of excellent quality.

*Example 4.* — The developed plate is treated as in Example 1, substituting 875 cc. of glycerine for methyl alcohol. Over 2.5 million sharp, excellent impressions were obtainable from plates so made.

*Example 5.* — The developed plate is treated as in Example 1, substituting 875 cc. of ethylene glycol for methyl alcohol. As many as five million sharp, excellent impressions were obtained from plates made in this way.

I claim:

1. In a method of preparing an aluminum lithographic plate wherein said plate is coated with an aqueous photosensitive emulsion that is hardenable on exposure to light, the coating exposed to the light on all areas of said plate where printing is not desired, the plate developed with a substantially aqueous developer to remove the coating from all areas not exposed to light, and substantially electrolytically depositing copper in the areas wherefrom the emulsion has been removed, the improvement which comprises conducting said electroplating with a solution consisting essentially of a solvent selected from the group consisting of an aliphatic or alicyclic polyhydroxylic compound containing from two to six carbon atoms, containing less than about seven percent by weight of water, and a copper salt ionizable in said solvent.

2. The method of claim 1 wherein said electroplating is conducted by brush plating.

3. The method of claim 1 wherein the polyhydroxylic compounds are di-hydroxy.

4. The method of claim 1 wherein the polyhydroxylic compound is a glycol.

5. The method of claim 1 wherein the polyhydroxylic compound is ethylene glycol.

6. The method of claim 1 wherein the solution containing copper ions comprises copper chloride.

7. In a method of preparing an aluminum lithographic plate wherein said plate is coated with an aqueous photosensitive emulsion that is hardenable on exposure to light, the coating exposed to the light on all areas of said plate where printing is not desired, the plate developed with a substantially aqueous developer to remove the coating from all areas not exposed to light, and substantially electrolytically depositing copper in the areas wherefrom the emulsion has been removed, the improvement which comprises conducting said electroplating in the absence of an electrolytic bath by connecting said plate as the cathode in a D.C. circuit; connecting a copper backing as the anode in said circuit; placing an electrical insulating element which is capable of absorbing an essentially non-aqueous electroplating solution in contact with the copper backing element; saturating said insulating element with a solution consisting essentially of a solvent selected from the group consisting of an aliphatic or alicyclic polyhydroxylic compound containing from two to six carbon atoms, containing less than about seven percent by weight of water, and a copper salt ionizable in said solvent solution, as the sole source of supply of copper to be electroplated on those portions of the aluminum lithographic plate from which the emulsion has been removed; placing the saturated insulating member in contact with the areas of said developed plate from which emulsion has been removed so that the only electroplating solution coming into contact with said plate comes from said insulating member, said plate being placed during electroplating in a trough so that spent electrolytic solution runs out of the trough, whereby copper is electrolytically deposited in said emulsion-removed areas; maintaining contact between said insulating element and said plate and maintaining said insulating element saturated with said solution while continuing electroplating; removing the insulating member from contact with said plate when a copper coating of adequate thickness has been deposited on said plate.

8. The method of claim 7 wherein the polyhydroxylic compounds are di-hydroxy.

9. The method of claim 7 wherein the polyhydroxylic compound is a glycol.

10. The method of claim 7 wherein the polyhydroxylic compound is ethylene glycol.

11. The method of claim 7 wherein the solution containing copper ions comprises copper chloride.

References Cited by the Examiner

UNITED STATES PATENTS

| | | | |
|---|---|---|---|
| 902,755 | 11/1908 | Meyer | 204—14 |
| 2,506,164 | 5/1950 | Morse | 204—17 |
| 2,833,702 | 5/1958 | Elfers | 204—224 |

JOHN H. MACK, *Primary Examiner.*

T. TUFARIELLO, *Assistant Examiner.*